(12) United States Patent
Lee et al.

(10) Patent No.: US 10,919,519 B2
(45) Date of Patent: Feb. 16, 2021

(54) HYBRID ELECTRIC VEHICLE AND METHOD OF CONTROLLING A DRIVE MODE THEREFOR

(71) Applicants: HYUNDAI MOTOR COMPANY, Seoul (KR); KIA MOTORS CORPORATION, Seoul (KR)

(72) Inventors: Jea Mun Lee, Seoul (KR); Joon Young Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 223 days.

(21) Appl. No.: 16/158,888

(22) Filed: Oct. 12, 2018

(65) Prior Publication Data
US 2019/0135268 A1 May 9, 2019

(30) Foreign Application Priority Data
Nov. 7, 2017 (KR) .................. 10-2017-0147222

(51) Int. Cl.
| | |
|---|---|
| G05D 1/00 | (2006.01) |
| B60W 20/16 | (2016.01) |
| B60W 30/182 | (2020.01) |
| G05D 1/02 | (2020.01) |
| B60R 21/34 | (2011.01) |
| B60H 3/00 | (2006.01) |
| B60W 50/00 | (2006.01) |
| B60H 1/00 | (2006.01) |

(52) U.S. Cl.
CPC .......... B60W 20/16 (2016.01); B60W 30/182 (2013.01); *B60H 1/008* (2013.01); *B60H 3/0085* (2013.01); *B60R 21/34* (2013.01); *B60R 2021/346* (2013.01); *B60W 2050/0095* (2013.01); *G05D 1/0278* (2013.01)

(58) Field of Classification Search
CPC ............... B60W 20/16; B60W 30/182; B60W 2050/0095; B60W 2556/50; B60W 2554/00; B60W 2555/20; B60W 10/06; B60W 10/08; G05D 1/0278; G05D 1/00; B60R 2021/346; B60R 21/34; B60H 3/0085; B60H 1/008; B60K 2006/4825; B60K 6/442
USPC ........ 701/22, 36; 180/65.1, 65.2, 65.4, 65.8; 903/945; 290/54; 363/40; 477/3
See application file for complete search history.

(56) References Cited

U.S. PATENT DOCUMENTS

| | | | | |
|---|---|---|---|---|
| 5,495,906 A | * | 3/1996 | Furutani | ................ B60K 6/442 180/65.23 |
| 5,815,824 A | * | 9/1998 | Saga | ..................... B60W 10/30 701/22 |

(Continued)

*Primary Examiner* — Shardul D Patel
(74) *Attorney, Agent, or Firm* — Brinks Gilson & Lione

(57) ABSTRACT

Disclosed is a hybrid electric vehicle and method of controlling operation of engine of the vehicle. The hybrid electric vehicle switches its drive mode in consideration of air pollution and pedestrians around the vehicle. A method of controlling a drive mode of a hybrid electric vehicle includes recognizing at least one of a pedestrian and an air pollution level around the hybrid electric vehicle, determining whether each of the recognized pedestrian and the recognized air pollution level meets a corresponding prescribed exhaust gas reduction mode request condition, and determining an exhaust gas reduction mode drive according to a result of the determination.

19 Claims, 7 Drawing Sheets

(56) References Cited

U.S. PATENT DOCUMENTS

| | | | |
|---|---|---|---|
| 7,290,627 B1* | 11/2007 | Gardner | B60K 6/442 |
| | | | 180/65.1 |
| 10,480,949 B2* | 11/2019 | Tateishi | G01S 17/89 |
| 2006/0055175 A1* | 3/2006 | Grinblat | F03B 13/26 |
| | | | 290/54 |
| 2007/0129878 A1* | 6/2007 | Pepper | B60W 50/0098 |
| | | | 701/123 |
| 2008/0041647 A1* | 2/2008 | Kim | B60K 6/365 |
| | | | 180/65.235 |
| 2008/0071465 A1* | 3/2008 | Chapman | G01C 21/3691 |
| | | | 701/117 |
| 2009/0044996 A1* | 2/2009 | Frank | B60W 20/13 |
| | | | 180/65.29 |
| 2011/0087394 A1* | 4/2011 | Shimanaka | B60W 30/1884 |
| | | | 701/22 |
| 2011/0093149 A1* | 4/2011 | Tanaka | B60Q 5/008 |
| | | | 701/22 |
| 2011/0193509 A1* | 8/2011 | Ooyama | H02M 1/12 |
| | | | 318/503 |
| 2013/0345976 A1* | 12/2013 | Li | G01C 21/3476 |
| | | | 701/533 |
| 2015/0197235 A1* | 7/2015 | Yu | B60W 10/06 |
| | | | 701/22 |
| 2015/0314776 A1* | 11/2015 | Yu | B60W 20/40 |
| | | | 701/22 |
| 2016/0101707 A1* | 4/2016 | Choi | B60L 15/007 |
| | | | 307/10.1 |
| 2016/0159281 A1* | 6/2016 | Jang | B60R 1/00 |
| | | | 348/148 |
| 2019/0007095 A1* | 1/2019 | Hayashi | H04B 3/06 |
| 2019/0023223 A1* | 1/2019 | Yoo | B60R 25/043 |
| 2019/0041228 A1* | 2/2019 | Singhal | B60W 40/08 |
| 2019/0386855 A1* | 12/2019 | Hayashi | H04L 25/0212 |

* cited by examiner (a)

(b)

Adult          Child          Patient
(Weight1)    (Weight2)    (Weight3)

3 X 1          2 X 2          1 X 3      =10

HYBRID ELECTRIC VEHICLE AND METHOD OF CONTROLLING A DRIVE MODE THEREFOR

Pursuant to 35 U.S.C. § 119(a), this application claims the benefit of earlier filing date and right of priority to Korean Application No. 10-2017-0147222, filed on Nov. 7, 2017, the contents of which are hereby incorporated by reference herein in their entirety.

BACKGROUND

Field

The present disclosure relates to a hybrid electric vehicle and method of controlling engine maneuvering therefor, and more particularly, to a hybrid electric vehicle and controlling method thereof.

Discussion of the Related Art

A hybrid electric vehicle (hereinafter abbreviated HEV) means a vehicle that uses two types of power sources that mainly include an engine and an electric motor. Hybrid electric vehicles have good fuel efficiency, excellent power performance and advantageously reduced exhaust gas in comparison with typical vehicles having an internal combustion engine only.

An HEV can operate in two drive modes depending on what kind of a power train is driven. One of the drive modes is an EV (electric vehicle) mode of drive with an electric motor only, and the other is an HEV (hybrid electric vehicle) mode of obtaining power by driving both an electric motor and an engine. The HEV performs a switching between the two modes depending on conditions while the HEV is running.

In a plug-in HEV (hereinafter abbreviated PHEV), the operation modes can be classified into a CD (charge depleting) mode and a CS (charge sustaining) mode depending on fluctuation of an SOC (state of charge) of a battery. Generally, a vehicle is run by activating an electric motor with power of a battery or batteries in CD mode. And, a power of an engine is mainly used in CS mode so as to prevent a battery SOC from getting further lowered.

SUMMARY

Accordingly, the present disclosure is directed to a hybrid electric vehicle and method of controlling engine maneuvering therefor. Particularly, the present disclosure is directed to switching a driving mode in consideration of environment and pedestrians.

An aspect of the present invention provides a method of performing a mode switching control in consideration of surrounding environment and hybrid electric vehicle for performing the same.

Another aspect of the present invention provides a method of determining that a surrounding situation is not appropriate for engine maneuvering and setting a drive mode according to the determination and vehicle for performing the same.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, aspects, and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

A further aspect of the invention provides a method of controlling a drive mode of a hybrid electric vehicle according to one embodiment of the present invention may include recognizing at least one of a pedestrian and an air pollution level around the hybrid electric vehicle, determining whether each of the recognized pedestrian and the recognized air pollution level meets a corresponding prescribed exhaust gas reduction mode request condition, and determining an exhaust gas reduction mode drive according to a result of the determination.

In another aspect of the present invention, as embodied and broadly described herein, a hybrid electric vehicle according to another embodiment of the present invention may include a pedestrian recognizing unit recognizing a pedestrian around the vehicle, an air recognizing unit recognizing an air pollution level, and a green zone control unit configured to determine whether each of the pedestrian recognized through the pedestrian recognizing unit and the air pollution level recognized through the air recognizing unit meets a corresponding prescribed exhaust gas reduction mode request condition and determine an exhaust gas reduction mode drive according to a result of the determination.

Accordingly, embodiments of the present invention provide the following effects/advantages.

First of all, the above-configured hybrid electric vehicle (HEV) related to at least one embodiment of the present invention can determine a drive mode in consideration of circumstances.

Particularly, it is determined whether a current location is an area inappropriate for exhaust gas discharge. If the current location is determined as the inappropriate area, a current mode is switched to an exhaust gas reduction mode, thereby protecting a pedestrian from potential damage due to exhaust gases.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In the whole specification, if a prescribed part 'comprises or includes' a prescribed component, this means that other components can be further included instead of excluding them unless a presence of especially opposed description. Moreover, the same reference numbers will be used throughout the whole specification to refer to the same parts. In this disclosure, "drive mode," "driving mode," and "operation mode" are interchangeably used.

Generally, inter-drive mode switching of vehicles is performed for the purpose of maximizing fuel efficiency and vehicle operation efficiency considering characteristics of the vehicle's power train. Typical control schemes for the inter-drive mode switching just focus on efficiency in operating an eco-friendly vehicle, but may be insufficient to ultimately achieve goals related to environment or public health as the typical control schemes are directed only fuel efficiency or operation efficiency of vehicles without consideration of environment or pedestrians' health. Thus, there are demands for minimizing engine maneuvering in specific areas or zones, in which reduction of exhaust gas is preferable. The specific zones may be established by regulations related to environment, public health, pedestrian density and the like.

Embodiments of the present invention propose a method of determining whether an area around the vehicle is affected by exhaust gas discharge and needs to restrict engine maneuvering according to a result of the determination. Embodiments also propose a hybrid electric vehicle for performing the same.

First, structures and control systems of a hybrid electric vehicle, according to embodiments of the present invention, are discussed. And, the concept of a special area affected by exhaust gas discharge is also discussed. Subsequently, methods of controlling operation of a combustion engine in a vehicle depending on environment around a vehicle are discussed.

Figure 1:
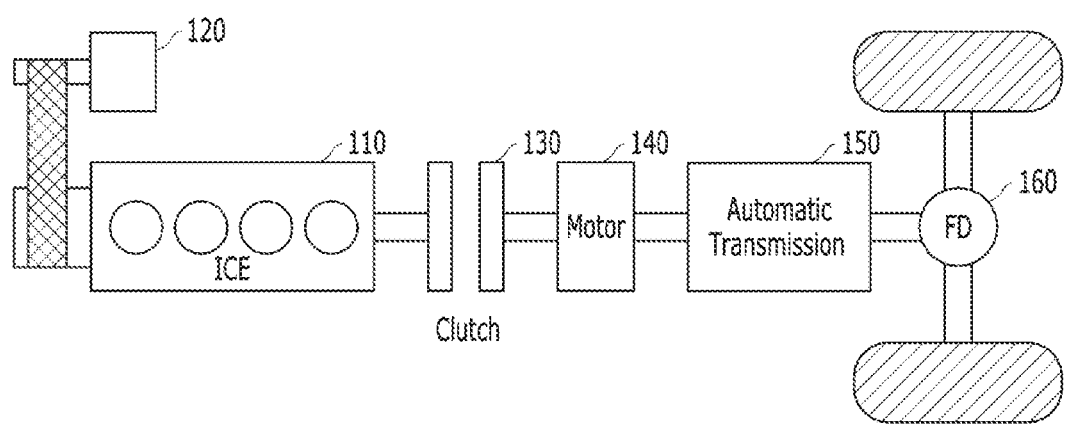
FIG. 1 shows one example of a power train structure of a hybrid electric vehicle to which embodiments of the present invention are applicable.

FIG. 1 shows one example of a power train structure of a hybrid electric vehicle according to embodiments of the present invention.

Referring to FIG. 1, illustrated is a power train of a hybrid electric vehicle (HEV) employing a parallel type hybrid system having an electric motor (or a drive motor) 140 and an engine clutch 130 installed between an internal combustion engine (ICE) 110 and a transmission 150.

In such a vehicle, when a driver steps on an accelerator pedal, the motor 140 is driven using power from a battery or batteries while the engine clutch 130 is open. Subsequently, wheels are provided with power of the motor through the transmission 150 and a final drive (FD) 160 so as to operate the vehicle (i.e., EV mode). As the vehicle is gradually accelerated so as to need greater driving power, an auxiliary motor (or, a start generation motor 120) operates to start the internal combustion engine 110.

In embodiments, when rotation speeds of the engine 110 and the motor 140 become equal to each other, the engine clutch 130 engages so that both of the engine 110 and the motor 140 or the engine 110 only can drive the vehicle (i.e., transition to HEV mode from EV mode). When a preset engine-off condition (e.g., vehicle deceleration, etc.) is met, the engine clutch 130 is opened and the engine 110 stops (i.e., transition to EV mode from HEV mode). In embodiments, when braking, the HEV can charge a battery or batteries by converting a drive power of wheels on braking into electric energy, which is called braking energy regeneration or regeneration braking.

In embodiments, the start generation motor 120 plays a role as a start motor on starting the internal combustion engine and also plays a role as a generator after the engine started on or in rotation energy recovery. Thus, the start generation motor 120 may be referred to as 'hybrid start generator (HSG)' or 'auxiliary motor' in some cases.

Figure 2:
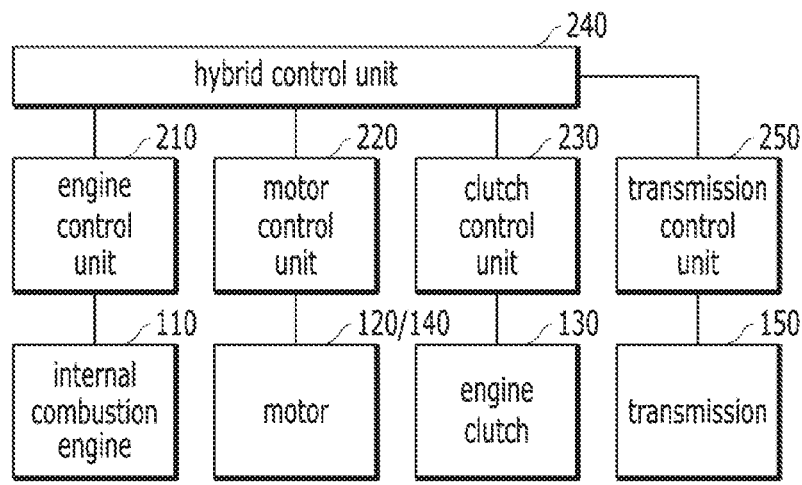
FIG. 2 is a block diagram showing one example of a control system of a hybrid electric vehicle to which embodiments of the present invention are applicable.

Interrelation between control units or controllers in a vehicle having the aforementioned power train applied thereto is shown in FIG. 2.

FIG. 2 is a block diagram showing one example of a control system of a hybrid electric vehicle to which embodiments of the present invention are applicable.

Figure 5:
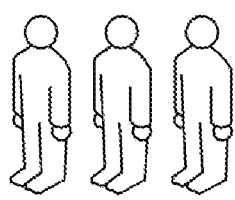
FIG. 5 is a diagram to describe the concept of performing correction by a pedestrian correcting unit according to one embodiment of the present invention.
Figure 5:
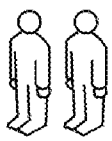
Figure 5:

Referring to FIG. 5, in an HEV according to embodiments of the present invention, an internal combustion engine 110 may be controlled by an engine control unit 210, torques of a start generation motor 120. An electric motor 140 may be controlled by a motor control unit (MCU) 220. An engine clutch 130 may be controlled by a clutch control unit 230. In embodiments, the engine control unit or controller 210 may be called an engine management system (EMS). The EMS may include two or more controllers. A transmission 150 is controlled by a transmission control unit 250. In some embodiments, a control unit of the start generation motor 120 and a control unit of an electric motor 140 may be provided separately.

In embodiments, each of the control units is connected to a hybrid control unit (HCU) 240 as a superordinate control unit that controls an overall mode switching process. Each control unit is able to provide information required for a drive mode change, an engine clutch control on gear shift and/or information required for an engine stop control to the HCU 240 under the control of the HCU 240 or perform an operation according to a control signal.

Particularly, the HCU 240 determines whether to switch a mode according to an operation state of the vehicle. For example, the HCU 240 determines an open timing of the engine clutch 130 and performs a hydraulic control (in case of a wet EC) or a torque capacity control (in case of a dry EC) on opening the engine clutch 130. The HCU 240 determines a state (e.g., lock-up, slip, open, etc.) of EC and is able to control a fuel injection stop timing. The HCU 240 is able to control engine rotation energy recovery by delivering a torque command for controlling the torque of the start generation motor 120 for the engine stop control to the motor control unit 220. Moreover, the HCU 240 can control a subordinate control unit for determining a mode switching condition and switching a mode in case of an adaptive mode switching control according to embodiments of the present invention.

Of course, the aforementioned interrelation between control units and functions/classification of the control units are exemplary and the present invention is not limited by their terms. For example, the HCU 240 can be implemented to be provided in a manner of replacing a corresponding function by one of other control units except itself, or in a manner of distributing a corresponding function to two or more of other control units.

The concept of an area or zone affected by exhaust gas discharge is described below.

In embodiments, an area may be set or designated as a special area or zone for reasons other than the determination of the hybrid vehicles. For example, an area (e.g., an exhaust gas management area such as London, Seoul, etc.) may be set or designated as a special zone or green zone by regulations, government policy or the like. An area (e.g., children protection (school) zone, indoor parking lot, residential area, park, drive-thru, hospital, etc.) may be set or designated as a special zone or green zone in need of exhaust gas reduction due to characteristics of the area, and the like.

In embodiments, an area or zone may be regarded or determined as a special area or zone by a hybrid electric vehicle using various direct/indirect information. An area designated or determined as a special area or zone using various direct/indirect information by a hybrid electric vehicle may include a pedestrian concentrated area or an air polluted area and the like based on air environment information or air quality information obtained through various sensors provided in the vehicle or wireless communications, statistic information, geographical information obtained through a navigation system and the like. For example, the designated area may correspond to an area which is determined that an air quality situation gets worse. In another example, the designated area is an area in which multiple pedestrians are actually detected around a vehicle through various sensors, or a pedestrian concentrated area that is determined based on big data by utilizing location information of smartphones. In a further example, an area is determined as a special zone as exhaust gases are estimated as massively generated on the basis of average vehicle velocity and traffic volume collected through telematics services, etc., or the like.

Moreover, an area affected by exhaust gas discharge may be set to a random administrative district unit, a zone formed by connecting a plurality of coordinates (i.e., boundary points) to each other, a pedestrian recognized point/specific facility or a portion thereof, or a zone within a predetermined radius from pedestrian recognized point/specific facility/coordinates.

Of course, the above setting examples are exemplary. Embodiments of the present invention are non-limited thereto. In other embodiments, there would be different rules, regulations, standards or formulas for setting or designating specific zones, or the area of specific zones.

For clarity of the following description, an area affected by exhaust gas discharge shall be named 'green zone'.

According to one embodiment of the present invention, a hybrid electric vehicle can determine whether a drive route or an area around the vehicle is the green zone through at least one of pedestrian recognition and air recognition.

According to embodiments, pedestrian and air quality recognition may include recognition using direct information and indirect information. In embodiments, the recognition using the direct information may include counting targets (for example, pedestrians) directly by a vehicle, obtaining direct information on targets through external channels, or receiving an input of a direct command from a driver. The recognition using the indirect information may mean recognizing targets using information for estimating/calculating targets through a prescribed information processing procedure, which is not direct information on the targets.

According to embodiments, pedestrian and air recognition may go through a prescribed correction process for reflecting a recognition result for targets using direct information and/or indirect information in a drive mode setting.

A schematic process of performing pedestrian and air recognition and device configuration for the same according to embodiments are described with reference to FIGS. 3 to 6.

Figure 3:
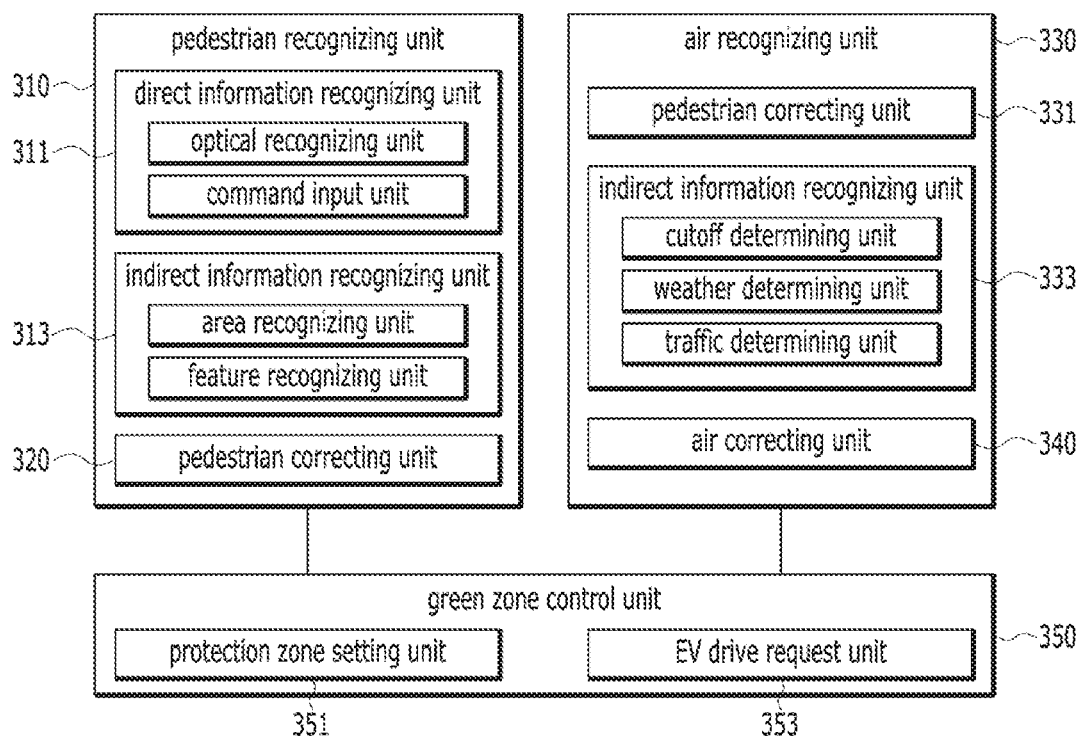
FIG. 3 is a block diagram showing one example of a hybrid electric vehicle according to functional classification for pedestrian and air recognition according to one embodiment of the present invention.

FIG. 3 is a block diagram showing one example of a hybrid electric vehicle according to functional classification for pedestrian and air recognition according to one embodiment of the present invention.

Referring to FIG. 3, a hybrid electric vehicle 300 according to one embodiment of the present invention may include a pedestrian information generating unit, an air information generating unit, and a green zone control unit 350 setting a drive mode by determining a green zone based on information generated from the pedestrian information generating unit and the air information generating unit.

The pedestrian information generating unit may include a pedestrian recognizing unit 310 recognizing a pedestrian on a drive route or in vehicle surroundings and a pedestrian correcting unit 320 performing correction by applying a weight according to a prescribed reference to information on the pedestrian recognized by the pedestrian recognizing unit 310. The air information generating unit may include an air recognizing unit 330 recognizing an air pollution level on a drive route or vehicle surroundings and an air correcting unit 340 performing correction by applying a weight according to a prescribed reference to information on the air pollution level recognized by the air recognizing unit 330. Each of the recognizing units is described in detail as follows.

First of all, the pedestrian recognizing unit 310 may include a direct information recognizing unit 311 and an indirect information recognizing unit 313.

The direct information recognizing unit 311 may include an optical recognizing unit and a command input unit. The optical recognizing unit can recognize a pedestrian around a vehicle by a method of recognizing the pedestrian in a manner of obtaining a vehicle ambient image through a vison sensor or an infrared sensor and extracting a silhouette of the pedestrian from the obtained image. In embodiments of the present invention, a scheme of extracting a pedestrian from an image is non-limited. The command input is a means for a driver to directly notify a vehicle that there is a pedestrian around the vehicle, and may include at least one of a gesture recognizing means and a voice recognizing means as well as a key button, a dial, a switch, and/or a touchscreen/touch sensor, manipulated through physical contacts. Of course, the types of the command input unit are exemplary. And, it is apparent to those skilled in the art that the command input unit is applicable to any means for notifying a vehicle that a pedestrian exists around the vehicle.

Figure 4:
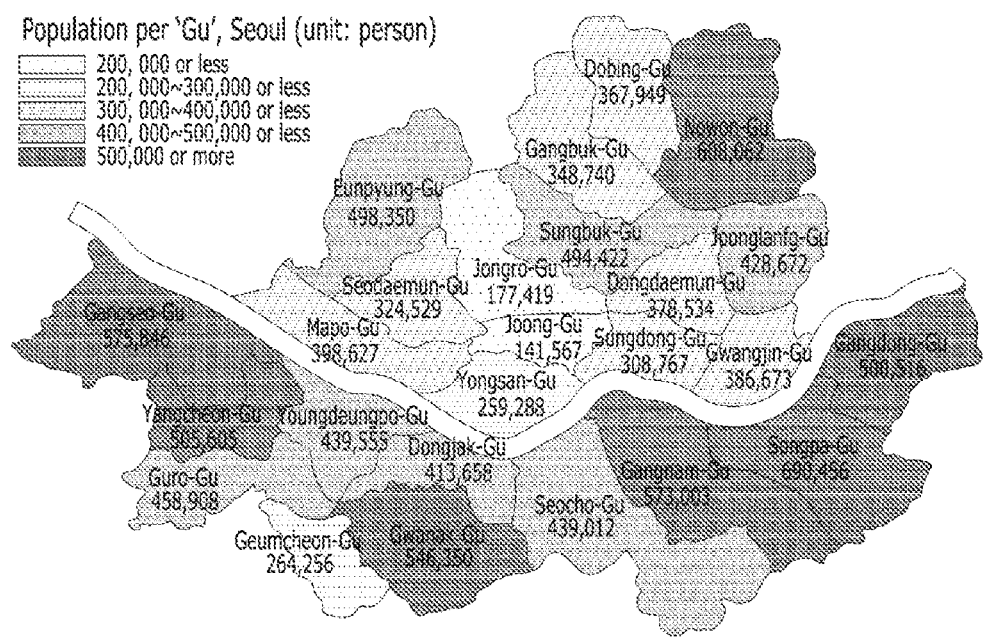
FIG. 4 shows one example of performing indirect information recognition according to one embodiment of the present invention.
Figure 4:
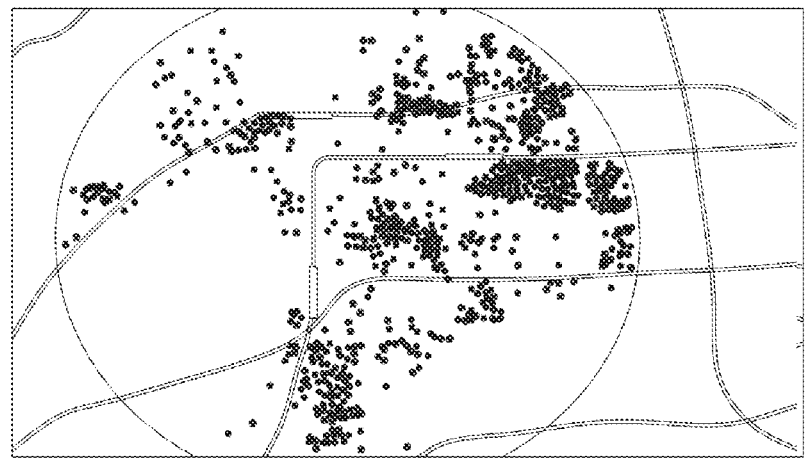

In embodiments, the indirect information recognizing unit 313 may include an area recognizing unit and a feature recognizing unit. The area recognizing unit may infer a presence or non-presence of a pedestrian using population statistics information on a prescribed area unit on current vehicle surroundings or a current drive route. And, the feature recognizing unit may infer a presence or non-presence of a pedestrian or configuration according to types or characteristics of buildings or geographic features. Recognition schemes of the area recognizing unit and the feature recognizing unit are described in detail with reference to FIG. 4. FIG. 4 shows one example of performing indirect information recognition according to one embodiment of the present invention.

First of all, the area recognizing unit may recognize a population dense area using population statistics per administrative district like FIG. 4 (*a*) or determine a presence or non-presence of a pedestrian of the corresponding area using floating population information per business zone. Moreover, the feature recognizing unit can determine a presence or non-presence of a pedestrian and configuration by substituting per-business type living/floating population information with per-area business distribution information. For example, it is able to determine that pedestrians exist around elementary educational institution in a time interval between school attending time and home time on weekdays. And, it is able to determine that patients proportional to the hospital scale exist around the hospital between hospital's office hours.

As described above, the pedestrian correcting unit 320 can perform correction by applying a weight according to a prescribed reference to information on a pedestrian recognized by the pedestrian recognizing unit 310. One example of performing a weight applied correction in the pedestrian correcting unit 320 is described with reference to FIG. 5. FIG. 5 is a diagram to describe the concept of performing correction by a pedestrian correcting unit according to one embodiment of the present invention.

In FIG. 5, through a feature recognizing unit, assume a situation that a school and a hospital exist around a vehicle and a situation that 3 adults, 2 children and 1 patient exist according to a corresponding pedestrian estimated result. Referring to FIG. 5, as 1, 2 and 3 of weights are applied to an adult, a child and a patient, respectively, the pedestrian correcting unit 320 may determine that 10 pedestrians exist unlike '6' estimated by the feature recognizing unit. A result of the determination may be forwarded to the green zone control unit 350. When a reference for the green zone control unit 350 to determine an EV mode drive is assumed as 8 pedestrians or more, if such a correction is performed despite that a real pedestrian estimated value fails to meet the reference, since weights for a child and patient requiring more necessity of protection are taken into consideration, it may bring an affect that exhaust gas discharge can be cut off.

The air recognizing unit can include a direction information recognizing unit 331 and an indirect information recognizing unit 333.

Figure 6:
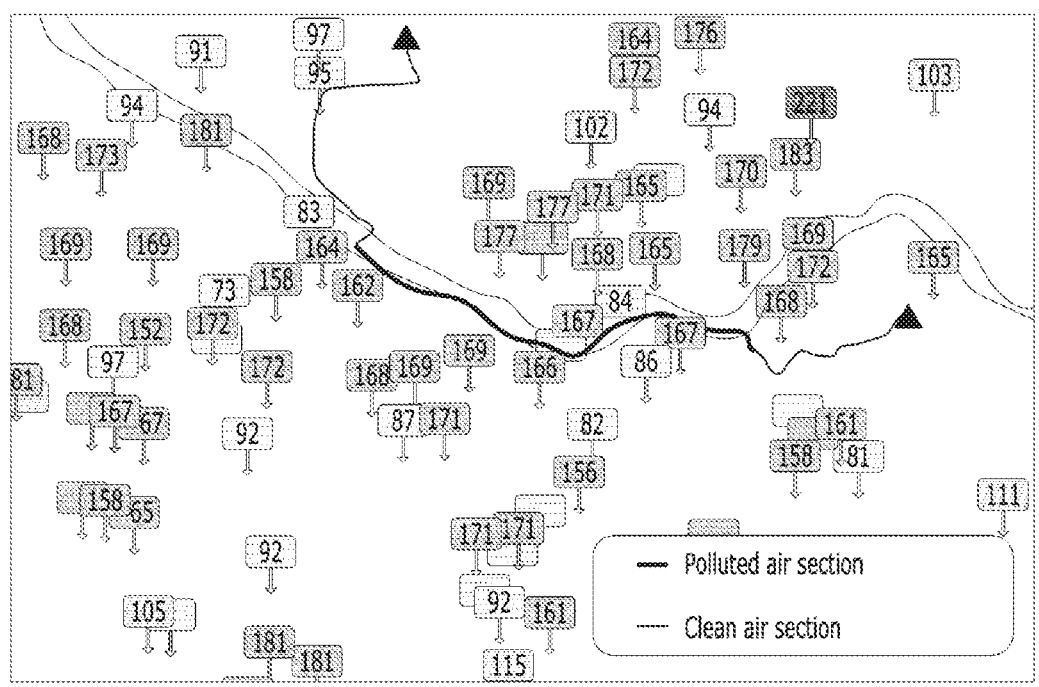
FIG. 6 shows one example of performing air contaminated section determination of a drive route by a direct information recognizing unit according to one embodiment of the present invention.

The direct information recognizing unit 331 can recognize an air pollution level by directly obtaining air pollution level information of a currently vehicle-driven area or an area included in a drive or traveling route. This is described with reference to FIG. 6. FIG. 6 shows one example of performing air contaminated section determination of a drive route by a direct information recognizing unit according to one embodiment of the present invention. Referring to FIG. 6, the direct information recognizing unit 331 obtains air pollution level information around a drive route, thereby determining a section over a preset pollution reference value as a polluted air section or determining a section not over the preset pollution reference value as a clean air section.

The indirect information recognizing unit 333 infers whether a current location or drive route is an environment in which pollutant discharge increases or an environment in which pollution can be accumulated. To this end, the indirect information recognizing unit 333 can include at least one of a cutoff determining unit, a weather determining unit and a traffic determining unit. The cutoff determining unit can determine whether it is a situation having poor ventilation like an indoor parking lot. For example, if a GPS signal is not received or if a GPS signal is not received currently while a last GPS signal received location corresponds to a building entrance, the cutoff determining unit can determine that it is an indoor parking lot. The weather determining unit can determine that pollutant accumulation will occur in a low wind speed area in weather information. The traffic determining unit can estimate an air pollution level of the corresponding area through traffic and congestion of traffic information.

Moreover, the air correcting unit 340, as described above, can perform correction by applying a weight according to a prescribed reference to information on an air pollution level recognized by the air recognizing unit 330. The correction can be performed in a manner of with reference to an air pollution level obtained by the direct information recognizing unit 331, applying a weight for equalizing a pollution factor determined indirectly to each of a presence or non-presence of a closed space, a traffic volume, and a wind speed differently.

For example, a corrected air pollution level can be obtained or estimated by (air pollution level information+closed space*K_1+traffic volume*K_2). Here, K_1 indicates an air pollution level equivalent factor for a closed space and K_2 indicates an air pollution equivalent factor for a traffic volume.

A result of the determination of the air correcting unit 340 can be delivered to the green zone control unit 350.

Meanwhile, the green zone control unit 350 may include a protection zone setting unit 351 setting a protection zone for driving in EV mode using information delivered from the pedestrian information generating unit and the air information generating unit and an EV drive request unit 353 making a request for an EV drive to a hybrid control unit when entering a corresponding zone. For example, if the near-vehicle pedestrian number detected through the optical recognizing unit (or corrected by the optical recognizing unit) is equal to or greater than a predetermined value, the protection zone setting unit 351 sets a current location as a protection zone immediately. If the near-vehicle pedestrian number is smaller than the predetermined value, the protection zone setting unit 351 can release the current location from the protection zone. In embodiments, a reference for the protect zone settings and a reference for the protect zone release may have the same value or different values. For another example, the protection zone setting unit 351 may set the polluted air section of FIG. 6 as a protection zone.

Figure 7:
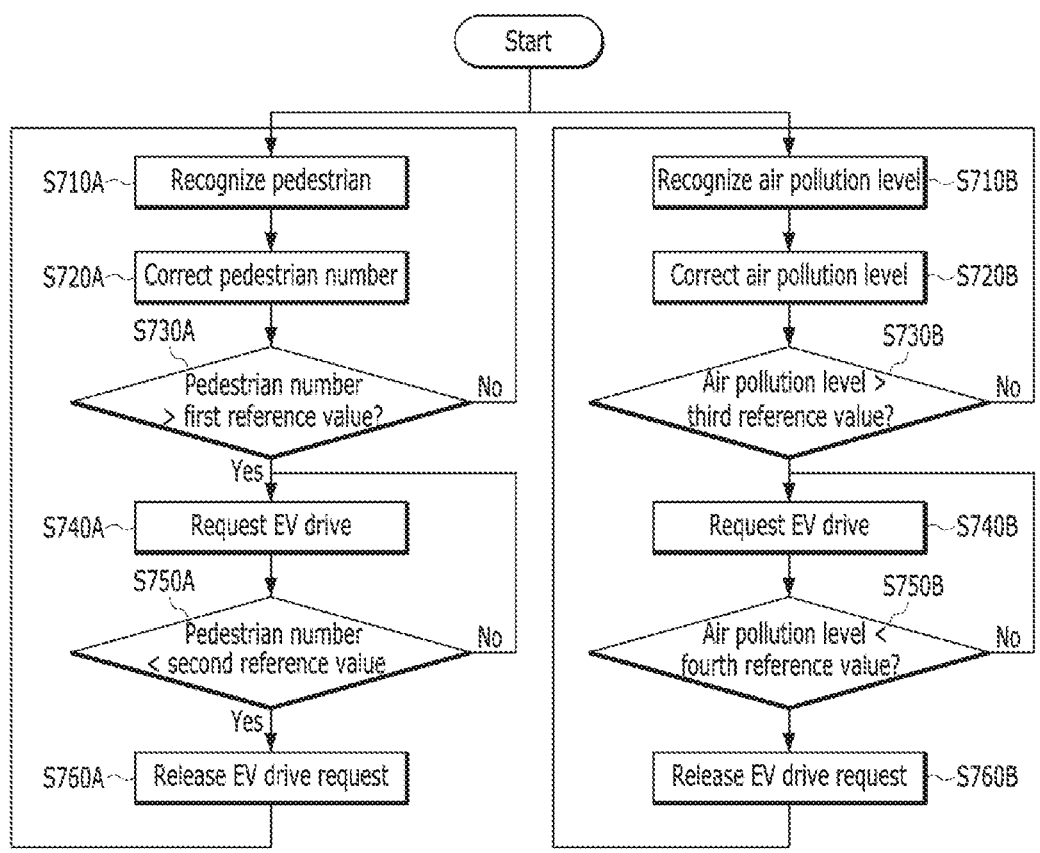
FIG. 7 is a flowchart for one example of a drive mode setting method according to one embodiment of the present invention.

A process for performing the aforementioned pedestrian and air recognition is represented as a flowchart shown in FIG. 7. FIG. 7 is a flowchart for one example of a drive mode setting method according to one embodiment of the present invention.

As shown in FIG. 7, an EV mode drive according to pedestrian recognition and an EV mode drive according to air pollution level recognition may include independent processes, respectively.

Referring to FIG. 7, pedestrian recognition can be performed by the pedestrian recognizing unit 310 [S710A]. A result of the pedestrian recognition can be corrected by the pedestrian correcting unit 320 through weight application [S720A]. A result of the correction is delivered to the green zone control unit 350. The correction result is compared with a first reference value [S730A]. If the correction result is greater than the first reference value, an EV drive request can be made [S740A]. After the EV drive request has been made, the correction result can be compared with a second reference value consistently, by periods, or on the basis of an event (e.g., fluctuation of the correction result, etc.) [S750A]. If the correction result is smaller than the second reference value, the EV drive request can be released [S760A]. In embodiments, the first reference value may include the pedestrian number becoming a reference of an EV drive request, the second reference value may include the pedestrian number becoming a reference of an EV drive request release, and the two reference values may be equal to or different from each other.

Except that a third reference value includes an air pollution level becoming a reference of an EV drive request and that a fourth reference value includes an air pollution level becoming a reference of an EV drive request release, a process according to air pollution level recognition is similar to the process according to the pedestrian recognition, whereby redundant description shall be omitted for clarity of the specification.

An example of implementation of a hybrid electric vehicle for performing the aforementioned process is described with reference to FIG. 8 as follows.

Figure 8:
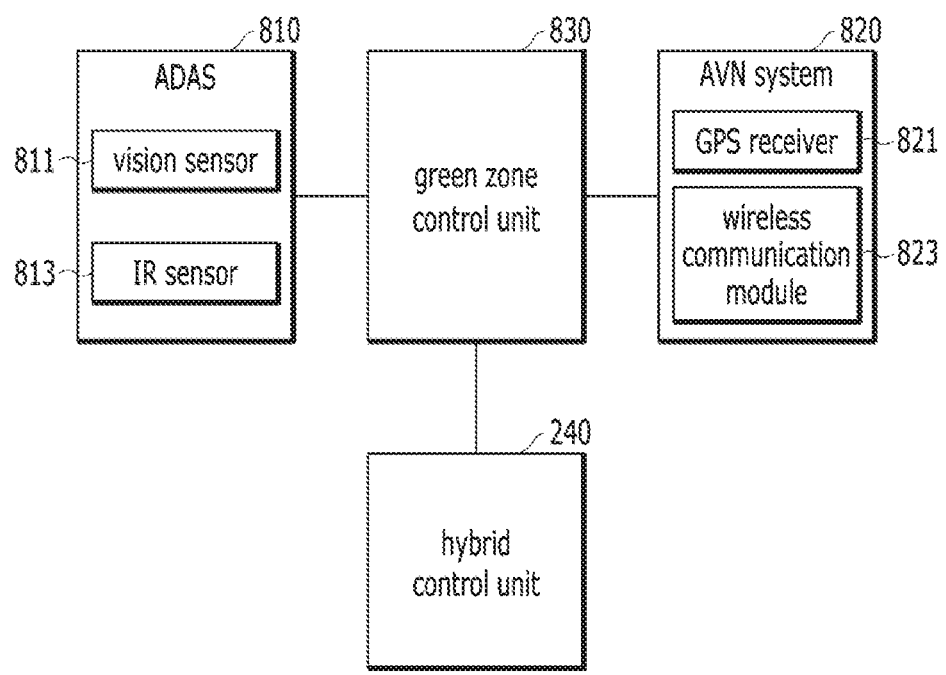
FIG. 8 is a block diagram for one example of a hybrid electric vehicle structure for performing pedestrian recognition and air quality recognition according to one embodiment of the present invention.

FIG. 8 is a block diagram for one example of a hybrid electric vehicle structure for performing pedestrian and air recognition according to one embodiment of the present invention.

Referring to FIG. 8, a hybrid electric vehicle according to embodiments may include an advanced driver assistant system (ADAS) control unit 810, an AVN (audio/video/navigation) system 820, a green zone control unit 830 and a hybrid control unit 240. Of course, the components shown in FIG. 8 are exemplary, and it is apparent that more or less components can be included.

The respective components are described as follows.

An ADAS control unit 810 includes various optical sensors such as a vision sensor 811, an IR sensor 813 and the like, thereby sensing a pedestrian existing within a sensing range of vehicle surroundings.

The AVN system 820 includes a GPS receiver 821 so as to provide a navigation function basically and receives various information through a wireless communication module 823. For example, through the wireless communication module 823, terrain/feature information for indirectly recognizing a pedestrian, air pollution level information for directly recognizing an air pollution level, or weather or traffic information for indirect recognition of an air pollution level may be obtained. The wireless communication module 823 is non-limited by any types of communication protocols if it is capable of data communication. For example, the wireless communication module 823 can include at least one of a Wi-Fi module, a 3G/4G module, and a telematics module.

In embodiments, the information obtained by the ADAS control unit 810 and/or the AVN system 820 can be forwarded to the green zone control unit 830. The green zone control unit 830 can perform a function corresponding to at least one of the indirect information recognizing unit 313, the pedestrian correcting unit 320, the indirect information recognizing unit 333, the air correcting unit 340 and the green zone control unit 350. When failing to implement in the green zone control unit 830 a function among the above-listed functions, the function may be performed by the ADAS control unit 810 and/or the AVN system 820 or implemented in a manner that the green zone control unit 830 itself is included in the ADAS control unit 810 or the AVN system 820. The green zone control unit 830 may set up a protection zone (e.g., green zone) according to (corrected) pedestrian information or air pollution level information and make a request for an EV mode drive in the protection zone to the hybrid control unit 240.

In the aforementioned embodiments of the present invention, although a drive mode of a vehicle for exhaust gas reduction is assumed as an EV mode for clarity of the description, a drive mode for exhaust gas reduction has the concept of including a CD (charge depleting) mode of PHEV of a reduced engine power drive as well as an EV mode of HEV.

The aforementioned present invention can be implemented in a program recorded medium as computer-readable codes. The computer-readable media include all kinds of recording devices in which data readable by a computer are saved. The computer-readable media include ROM, RAM, CD-ROM, magnetic tapes, floppy discs, optical data storage devices, and the like for example and also include carrier-wave type implementations (e.g., transmission via Internet).

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a drive mode of a hybrid electric vehicle, comprising:
   recognizing at least one of a pedestrian and an air pollution level around the hybrid electric vehicle;
   determining whether each of the recognized pedestrian and the recognized air pollution level meets a corresponding prescribed exhaust gas reduction mode request condition;

determining an exhaust gas reduction mode drive according to a result of the determination;
controlling to cause the hybrid vehicle to operate in the exhaust gas reduction mode; and
wherein the recognizing comprises: estimating the number of the pedestrian through at least one of area information and feature information.

2. The method of claim 1, further comprising correcting the recognized pedestrian or the recognized air pollution level, wherein the determining is performed using a result of the correction.

3. The method of claim 2, the correcting, comprising:
multiplying the number of the recognized pedestrian by a different weight per configuration and adding a result of the multiplication; or
multiplying each recognition scheme of the recognized air pollution level by a different equivalent factor and adding a result of the multiplication.

4. The method of claim 1, the recognizing, comprising:
recognizing the number of the pedestrian through at least one optical sensor.

5. The method of claim 4, wherein the area information comprises at least one of per-area population statistics information and per-business floating population information and wherein the feature information comprises at least one of per-area business type distribution information and per-business type living/floating population information.

6. The method of claim 1, the recognizing, comprising:
recognizing the air pollution level directly by obtaining air pollution level information; or
estimating the air pollution level through at least one of a presence or non-presence of a closed space, weather information and traffic information.

7. The method of claim 6, wherein the weather information comprises wind speed information at least and wherein the traffic information comprises traffic volume information and congestion level information at least.

8. The method of claim 1, further comprising:
setting a zone meeting a prescribed condition; and
making a request for the exhaust gas reduction mode drive when entering the zone,
wherein the exhaust gas reduction mode comprises a CD mode of PHEV, an EV mode of HEV, or an engine power reduction drive mode.

9. The method of claim 1, further comprising:
while the exhaust gas reduction mode drive is performed, determining whether a prescribed exhaust gas reduction mode release condition for each of the recognized pedestrian and the recognized air pollution level is met; and
if the exhaust gas reduction mode release condition for each of the recognized pedestrian and the recognized air pollution level is met, making a request for an exhaust gas reduction mode release.

10. A non-transitory computer-readable recording medium in which a program for executing a method of controlling engine maneuvering of a hybrid electric vehicle according to claim 1 is recorded.

11. A hybrid electric vehicle, comprising:
a pedestrian recognizing unit configured to recognize a pedestrian around the vehicle;
an air recognizing unit configured to recognize an air pollution level; and
a green zone control unit configured to determine whether each of the pedestrian recognized through the pedestrian recognizing unit and the air pollution level recognized through the air recognizing unit meets a corresponding prescribed exhaust gas reduction mode request condition and further configured to cause the vehicle to operate in an exhaust gas reduction mode according to a result of the determination,
wherein the pedestrian recognizing unit comprises at least one of an area recognizing unit configured to estimate the number of the pedestrian through area information, or a feature recognizing unit configured to estimate the number of the pedestrian through feature information.

12. The hybrid electric vehicle of claim 11, further comprising:
a pedestrian correcting unit configured to correct the number of the pedestrian recognized by the pedestrian recognizing unit; and
an air correcting unit configured correct the air pollution level recognized by the air recognizing unit.

13. The hybrid electric vehicle of claim 12, wherein the pedestrian correcting unit multiplies the number of the recognized pedestrian by a different weight per configuration and then adds a result of the multiplication and wherein the air correcting unit multiplies each recognition scheme of the recognized air pollution level by a different equivalent factor and then adds a result of the multiplication.

14. The hybrid electric vehicle of claim 11, wherein the pedestrian recognizing unit comprises an optical recognizing unit configured to recognize the number of the pedestrian through at least one optical sensor.

15. The hybrid electric vehicle of claim 14, wherein the area information comprises at least one of per-area population statistics information and per-business floating population information and wherein the feature information comprises at least one of per-area business type distribution information and per-business type living/floating population information.

16. The hybrid electric vehicle of claim 11, the air recognizing unit, comprising:
a direct information recognizing unit configured to recognize the air pollution level directly by obtaining air pollution level information; and
an indirect information recognizing unit configured to estimate the air pollution level through at least one of a presence or non-presence of a closed space, weather information and traffic information.

17. The hybrid electric vehicle of claim 16, wherein the weather information comprises wind speed information at least and wherein the traffic information comprises traffic volume information and congestion level information at least.

18. The hybrid electric vehicle of claim 11, the green zone control unit, comprising:
a protection zone setting unit configured to set a zone meeting a prescribed condition; and
an exhaust gas reduction drive requesting unit configured to make a request for the exhaust gas reduction mode drive when entering the zone,
wherein the exhaust gas reduction mode comprises a CD mode of PHEV, an EV mode of HEV, or an engine power reduction drive mode.

19. The hybrid electric vehicle of claim 11, wherein the green zone control unit, while the exhaust gas reduction mode drive is performed, determines whether a prescribed exhaust gas reduction mode release condition for each of the recognized pedestrian and the recognized air pollution level is met and wherein if the exhaust gas reduction mode release condition for each of the recognized pedestrian and the recognized air pollution level is met, the green zone control unit makes a request for an exhaust gas reduction mode release.

* * * * *